(12) United States Patent
James et al.

(10) Patent No.: US 12,296,812 B2
(45) Date of Patent: May 13, 2025

(54) SYSTEM AND METHOD FOR CONTROLLING BRAKING FUNCTIONS IN AN AUTONOMOUS VEHICLE

(71) Applicant: Outrider Technologies, Inc., Brighton, CO (US)

(72) Inventors: Peter James, Denver, CO (US); Gary Michael Seminara, Golden, CO (US); Lawrence S. Klein, Bend, OR (US)

(73) Assignee: Outrider Technologies, LLC, Brighton, CO (US)

( * ) Notice: Subject to any disclaimer, the term of this patent is extended or adjusted under 35 U.S.C. 154(b) by 0 days.

(21) Appl. No.: 18/400,660

(22) Filed: Dec. 29, 2023

(65) Prior Publication Data
US 2024/0246519 A1   Jul. 25, 2024

Related U.S. Application Data

(63) Continuation of application No. 16/667,830, filed on Oct. 29, 2019, now Pat. No. 11,858,491.
(Continued)

(51) Int. Cl.
*B60T 8/00*   (2006.01)
*B60T 8/17*   (2006.01)
(Continued)

(52) U.S. Cl.
CPC .............. *B60T 8/92* (2013.01); *B60T 8/1701* (2013.01); *B60T 8/342* (2013.01);
(Continued)

(58) Field of Classification Search
None
See application file for complete search history.

(56) References Cited

U.S. PATENT DOCUMENTS

| 3,881,748 A | 5/1975 | Donaldson |
| 4,366,965 A | 1/1983 | Rhodes |
| (Continued) | | |

FOREIGN PATENT DOCUMENTS

| CA | 2555212 A1 | 9/2005 |
| DE | 102012102648 B4 | 9/2012 |
| (Continued) | | |

OTHER PUBLICATIONS

'Re: Adapting the gladhand to an airhose'. In Steel Soldiers Military Vehicles Supersite Forums [online], Nov. 24, 2008 [ retrieved on Nov. 4, 2020], Retrieved from the Internet: <https://www.steelsoldiers.com/threads/adapting-the-gladhand-to-an-airhose ,28023/post-292796>. 5 pages. (Year: 2008).
(Continued)

*Primary Examiner* — Truc M Do
(74) *Attorney, Agent, or Firm* — Loginov & Associates, PLLC; William A. Loginov

(57) ABSTRACT

A system and method for allowing failover between an autonomously controlled braking system and a human controlled braking system in a truck having pneumatic brake lines is provided. A cab-mounted brake actuator is arranged to be handled by the human operator and is arranged to selectively deliver pressurized air to truck brakes and a trailer brake air supply. A controller performs autonomous braking operations in response to control inputs and senses when a human operator is handling the actuator. A plurality of valves, interconnected between a pressurized air source on the truck, the actuator, the truck brakes and the trailer brake air supply, are responsive to the controller, and are arranged to override selective delivery of pressurized air to the truck brakes of the truck and the trailer brake air supply in response to the autonomous braking operations in favor of selective delivery of pressurized air via the actuator.

20 Claims, 10 Drawing Sheets

Related U.S. Application Data

(60) Provisional application No. 62/752,687, filed on Oct. 30, 2018.

(51) Int. Cl.
  *B60T 8/34* (2006.01)
  *B60T 8/92* (2006.01)
  *B60W 60/00* (2020.01)
  *G05D 1/00* (2006.01)

(52) U.S. Cl.
  CPC ....... *B60W 60/0059* (2020.02); *G05D 1/0061* (2013.01); *G05D 1/021* (2013.01)

(56) References Cited

U.S. PATENT DOCUMENTS

| | | | |
|---|---|---|---|
| 4,448,447 A | 5/1984 | Funk | |
| 4,548,783 A | 10/1985 | Dalke | |
| 5,607,221 A | 3/1997 | Justus | |
| 6,179,319 B1 | 1/2001 | Malisch | |
| 6,863,538 B2 | 3/2005 | Mattern | |
| 7,562,918 B2 | 7/2009 | Toma | |
| 7,669,875 B2 | 3/2010 | Halverson | |
| 7,748,549 B1 | 7/2010 | Browning | |
| 8,187,020 B2 | 5/2012 | Algueera Gallego | |
| 8,301,318 B2 | 10/2012 | Lacaze | |
| 8,532,862 B2 | 9/2013 | Neff | |
| 8,727,084 B1 | 5/2014 | Kuker | |
| 8,806,689 B2 | 8/2014 | Riviere | |
| 9,068,668 B2 | 6/2015 | Grover | |
| 9,211,889 B1 | 12/2015 | Hoetzer | |
| 9,302,678 B2 | 4/2016 | Murphy | |
| 9,592,964 B2 | 3/2017 | Aleks | |
| 10,081,504 B2 | 9/2018 | Walford | |
| 11,099,560 B2 | 8/2021 | Smith | |
| 11,429,099 B2 | 8/2022 | Smith | |
| 2003/0233189 A1 | 12/2003 | Hsiao | |
| 2004/0146384 A1 | 7/2004 | Whelan | |
| 2005/0017506 A1 | 1/2005 | Caldwell | |
| 2005/0103541 A1 | 5/2005 | Nelson | |
| 2006/0071447 A1 | 4/2006 | Gehring | |
| 2007/0030349 A1 | 2/2007 | Riley | |
| 2008/0030068 A1* | 2/2008 | Bensch | B60T 13/588 303/17 |
| 2009/0009304 A1 | 1/2009 | Lacasse | |
| 2011/0037241 A1 | 2/2011 | Temple | |
| 2011/0254504 A1 | 10/2011 | Haddad | |
| 2012/0248167 A1 | 10/2012 | Flanagan | |
| 2013/0320751 A1 | 12/2013 | Eberling | |
| 2014/0007386 A1 | 1/2014 | Liao | |
| 2014/0116812 A1* | 5/2014 | Simpson | B60T 17/20 188/1.11 R |
| 2014/0149011 A1* | 5/2014 | Eberling | B60T 8/1708 701/70 |
| 2014/0268095 A1 | 9/2014 | Petkov | |
| 2014/0318903 A1* | 10/2014 | Simpson | B60T 17/20 188/1.11 R |
| 2015/0251366 A1 | 9/2015 | Voth | |
| 2015/0258908 A1 | 9/2015 | Fukui | |
| 2015/0263541 A1 | 9/2015 | Fukui | |
| 2015/0328655 A1 | 11/2015 | Reichler | |
| 2016/0054143 A1 | 2/2016 | Abuelsaad | |
| 2016/0075526 A1 | 3/2016 | Avalos | |
| 2016/0260328 A1 | 9/2016 | Mishra | |
| 2016/0304122 A1 | 10/2016 | Herzog | |
| 2016/0318490 A1 | 11/2016 | Ben Shalom | |
| 2017/0031356 A1 | 2/2017 | Bell | |
| 2017/0050526 A1 | 2/2017 | Sommarström | |
| 2017/0165839 A1 | 6/2017 | Tan | |
| 2017/0185082 A1 | 6/2017 | Matos | |
| 2017/0186124 A1 | 6/2017 | Jones | |
| 2017/0305694 A1 | 10/2017 | Mcmurrough | |
| 2017/0361844 A1 | 12/2017 | Kahn | |
| 2017/0364070 A1 | 12/2017 | Oba | |
| 2017/0369260 A1 | 12/2017 | Hoofard | |
| 2018/0050573 A1 | 2/2018 | Strand | |
| 2018/0202822 A1 | 7/2018 | Delizio | |
| 2018/0250833 A1 | 9/2018 | Boria | |
| 2018/0264963 A1 | 9/2018 | Dudar | |
| 2018/0265076 A1 | 9/2018 | Hall | |
| 2018/0281178 A1 | 10/2018 | Jacobsen | |
| 2019/0002216 A1 | 1/2019 | Walford | |
| 2019/0064828 A1 | 2/2019 | Meredith | |
| 2019/0064835 A1 | 2/2019 | Hoofard | |
| 2019/0077600 A1 | 3/2019 | Watts | |
| 2019/0095861 A1 | 3/2019 | Baldwin | |
| 2019/0129429 A1 | 5/2019 | Juelsgaard | |
| 2019/0187716 A1 | 6/2019 | Cantrell | |
| 2019/0235504 A1 | 8/2019 | Carter | |
| 2019/0299732 A1 | 10/2019 | Smith | |
| 2019/0299946 A1 | 10/2019 | Miller, Jr. | |
| 2019/0302764 A1 | 10/2019 | Smith | |
| 2019/0322319 A1 | 10/2019 | Smith | |
| 2020/0387166 A1 | 12/2020 | Lacaze | |
| 2020/0387168 A1 | 12/2020 | Lacaze | |
| 2021/0053407 A1 | 2/2021 | Smith | |
| 2021/0141384 A1 | 5/2021 | Lacaze | |
| 2021/0192784 A1 | 6/2021 | Taylor | |
| 2022/0080584 A1 | 3/2022 | Wicks | |
| 2022/0371199 A1 | 11/2022 | Schultz | |

FOREIGN PATENT DOCUMENTS

| | | |
|---|---|---|
| DE | 102012023999 A1 | 1/2014 |
| EP | 2886497 B1 | 6/2015 |
| JP | S5885702 A | 5/1983 |
| JP | 3215916 B2 | 10/2001 |
| WO | 2004076254 A1 | 9/2004 |
| WO | 2010118420 A2 | 10/2010 |
| WO | 2013180622 A1 | 12/2013 |
| WO | 2014095806 A1 | 6/2014 |
| WO | 2016205559 A1 | 12/2016 |
| WO | 2017100716 A1 | 6/2017 |
| WO | 2018001915 A1 | 1/2018 |
| WO | 2018038256 | 3/2018 |
| WO | 2019042958 A1 | 3/2019 |
| WO | 2019046383 A1 | 3/2019 |
| WO | 2019118848 A1 | 6/2019 |

OTHER PUBLICATIONS

Bennett, Sean. Modern Diesel Technology: Brakes, Suspension & Steering. New York, Delmar, 2007. pp. 53-54. ISBN-10: 1-4180-1372-2. (Year: 2007).

Fuchs C et al.: "3D pose estimation for articulated vehicles using Kalman-filter based tracking", Pattern Recognition. Image Analysis, Allen Press, Lawrence, KS, US, vol. 26, No. 1, Jul. 23, 2016 (Jul. 23, 2016), pp. 109-113, XP036013102, ISSN: 1054-6618, DOI: 10.1134/S1054661816010077 [retrieved on Jul. 23, 2016].

Tofael Ahamed: "Navigation of an Autonomous Tractor Using Multiple Sensors", Thesis, Feb. 22, 2008 (Feb. 22, 2008), XP055527539, Retrieved from the Internet: URL:https://tsukuba.repo.nii.ac.jp/?action =repository actioncommon download&item id=20956 &item- -no=I&attribute- id=l7&file- no=2 [retrieved on Nov. 27, 2018] 183 pages, Chapter 9.

U.S. Appl. No. 62/715,757, filed Aug. 7, 2018, Smith et al., entitled Systems and Methods for Automated Operation and Handling of Autonomous Trucks and Trailers Hauled Thereby.

* cited by examiner

SYSTEM AND METHOD FOR CONTROLLING BRAKING FUNCTIONS IN AN AUTONOMOUS VEHICLE

RELATED APPLICATION

This application is a continuation of U.S. patent application Ser. No. 16/667,830, entitled SYSTEM AND METHOD FOR CONTROLLING BRAKING FUNCTIONS IN AN AUTONOMOUS VEHICLE, filed Oct. 29, 2019, which claims the benefit of U.S. Provisional Application Ser. No. 62/752,687, entitled SYSTEM AND METHOD FOR CONTROLLING BRAKING FUNCTIONS IN AN AUTONOMOUS VEHICLE, filed Oct. 30, 2019, the teachings of which are expressly incorporated herein by reference.

FIELD OF THE INVENTION

This invention relates to autonomous vehicles, and more particularly to braking and backup control systems for such vehicles.

BACKGROUND OF THE INVENTION

Trucks are an essential part of modern commerce. These trucks transport materials and finished goods across the continent within their large interior spaces. Such goods are loaded and unloaded at various facilities that can include manufacturers, ports, distributors, retailers, and end users. Large over-the road (OTR) trucks typically consist of a tractor or cab unit and a separate detachable trailer that is interconnected removably to the cab via a hitching system that consists of a so-called fifth wheel and a kingpin. More particularly, the trailer contains a kingpin along its bottom front and the cab contains a fifth wheel, consisting a pad and a receiving slot for the kingpin. When connected, the kingpin rides in the slot of the fifth wheel in a manner that allows axial pivoting of the trailer with respect to the cab as it traverses curves on the road. The cab provides power (through (e.g.) a generator, pneumatic pressure source, etc.) used to operate both itself and the attached trailer.

A wide range of solutions have been proposed over the years to automate one or more processes of a truck, thereby reducing or eliminating the input labor needed by a driver. In one application, trucks that are used to shunt trailers around a yard between storage/parking locations and loading/unloading docks. Such vehicles are generally termed "yard trucks" and can be powered by fossil fuels or electricity in various configurations. Various novel autonomous vehicle implementations and function associated with autonomous vehicle yard trucks (herein termed "AV yard trucks"), are described in commonly assigned U.S. patent application Ser. No. 16/282,258, entitled SYSTEMS AND METHODS FOR AUTOMATED OPERATION AND HANDLING OF AUTONOMOUS TRUCKS AND TRAILERS HAULED THEREBY, filed Feb. 21, 2019, and related applications thereto, the teachings of which are expressly incorporated herein by reference by way of useful background information.

Autonomous, typically unmanned, trucks (AV yard and/or OTR) require computer control over the pneumatic brake system to control speed under nominal conditions and to stop the truck under abnormal or emergency situations. Without this control capability, the autonomous vehicle would not be safely operable. Dual mode autonomous vehicles (vehicles which can be operated manually by an onboard operator or autonomously without an occupant), furthermore, require that the computer control be disengaged during manual operation to minimize the chance of accidental activation of the braking system. This failover capability between automated and human operation may pose challenges in continuous control and operation of a vehicle, as priority must be given to the human operator, while not compromising the future operation of automated systems.

SUMMARY OF THE INVENTION

This invention overcomes disadvantages of the prior art by providing an Electronic Brake Controller (EBC) system that addresses the challenges of allowing for failover operation in which a human driver must intervene with autonomous operation, whereby the autonomous braking system is disengaged to ensure safe operation, and avoid accidental deployment of brakes in contravention to the human driver's commands. In an exemplary implementation, the system and method operates to accept braking commands over a communications bus from a control computer and/or via discrete digital inputs from a safety-rated PLC. The system and method also enables control of pneumatic valves to apply pressure to the (e.g.) OEM pneumatic brakes based on those commands. It also allows computer control to be disengaged when configured for manual operation, and monitors control of the pneumatic brakes, computer control lockouts, and internal logic components. The system and method further allows for application of full (emergency stop) braking efforts when anomalies occur and/or power is lost to the system, ensure vehicle safety.

In an illustrative embodiment a system and method for allowing failover between an autonomously controlled braking system and a human controlled braking system in a truck having pneumatic brake lines is provided. A cab-mounted brake actuator is arranged to be handled by the human operator, and is arranged to selectively deliver pressurized air to truck brakes and a trailer brake air supply. A controller performs autonomous braking operations in response to control inputs, and senses when a human operator is handling the actuator. A plurality of valves are provided in a pressure circuit, interconnected between a pressurized air source on the truck, the actuator, the truck brakes and the trailer brake air supply, are responsive to the controller, and are arranged to override selective delivery of pressurized air to the truck brakes of the truck and the trailer brake air supply in response to the autonomous braking operations in favor of selective delivery of pressurized air via the actuator. Illustratively, the actuator is at least one of a brake foot pedal assembly and a parking brake handle assembly. The controller can be arranged to apply emergency stop braking settings to the valves in response to predetermined conditions. The controller includes a vehicle CAN bus that communicates with other vehicle systems. The valves can be adapted to selectively deliver pressurized air to each of service brakes and parking brakes, and/or the valves include a plurality of pressure sensing monitor switches, poppet valves that selectively release pressurized air to an external environment and shuttle valves that override pressure flow from each of a plurality of inputs. The pressure circuit can also include a tank monitor, which is adapted to determine whether tank pressure falls below a predetermined threshold, and in response thereto, the valves apply at least one of the service brakes and the parking brakes and direct the controller to ignore predetermined sensors and switches within the pressure circuit. The controller inputs and outputs signals using at least two substantially redundant physical and communication protocol channels.

BRIEF DESCRIPTION OF THE DRAWINGS

The invention description below refers to the accompanying drawings, of which.

DETAILED DESCRIPTION

I. System Overview

Figure 1:
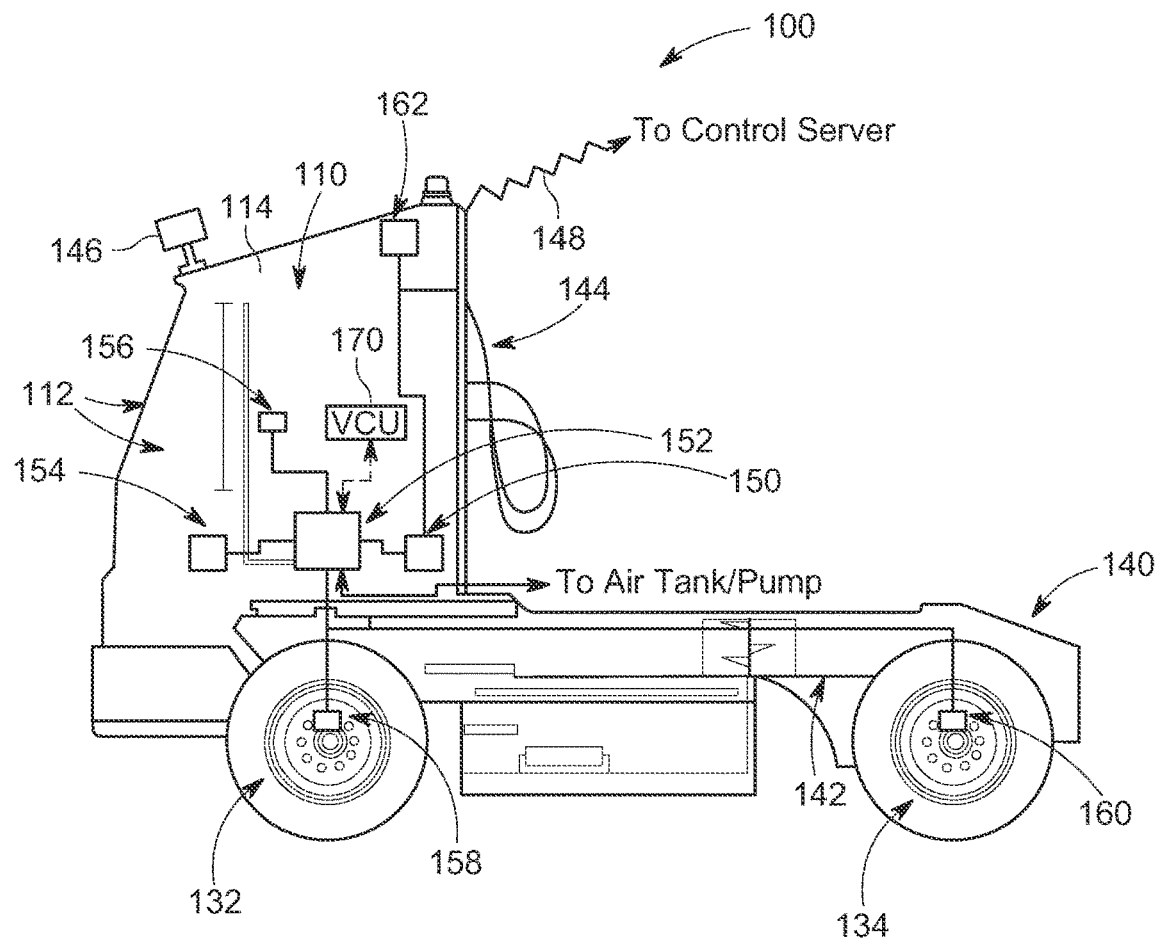
FIG. 1 is a side view of an exemplary autonomous vehicle (e.g.) yard truck (AV yard truck) showing various brake systems and controllers that are operated in accordance with the system and method herein.
Figure 1A:
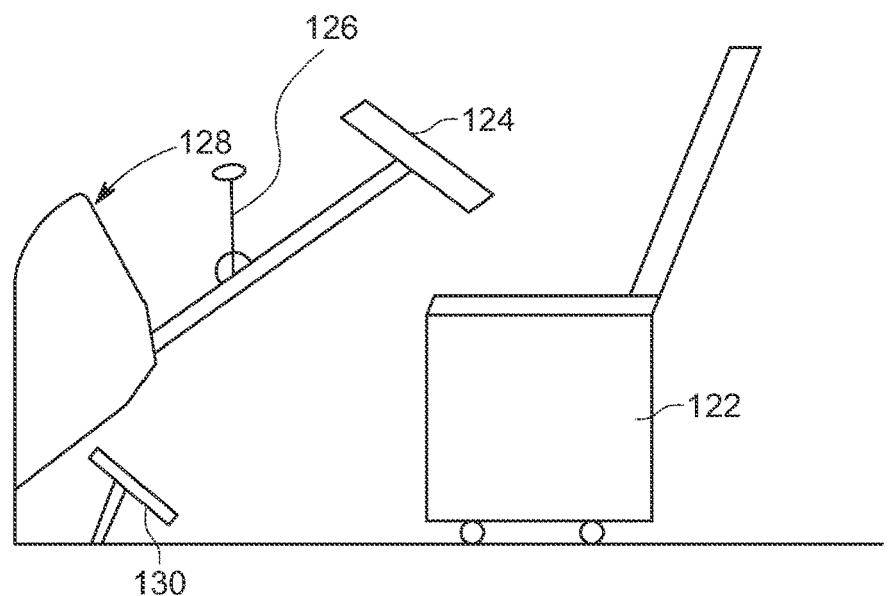
FIG. 1A is a side view of a simplified cab interior with human seating and controls relative to the truck of FIG. 1.

Reference is made to FIG. 1, which shows a typical autonomous vehicle truck (e.g. an electrically powered AV yard truck) 100. The truck 100 includes a cab 110 that is adapted for human control in addition to autonomous operation, and thus, includes a windshield 112 and access door 114, as well as a seat 122, steering wheel 124, gear shift 126, dashboard instrumentation/gauges 128, and floor pedals for accelerator and braking 130 (FIG. 1A). The truck includes steerable front wheels 132 and (typically) drive rear wheels 134. A fifth wheel trailer hitch 140 is provided on the rear of the chassis 142, and can be conventional in design (with appropriate automated control). Other features of the truck, such as the pneumatic connections (e.g. glad hands) and/or power connections 144 can be adapted for autonomous/unattended operation when hitching and unhitching the trailer. A vision system camera assembly 146 is also provided and can be adapted to assist in autonomous guidance. Likewise, other systems (e.g. rear cameras, LIDAR and other range sensors) can be provided to assist autonomous operation (not shown). These systems are managed by one or more hardware and software controllers instantiated on the truck 100, and/or within a remote server system, linked to the truck by (e.g. wireless) a network link 148. The above-incorporated U.S. Provisional Application Ser. No. 62/715,757, entitled SYSTEMS AND METHODS FOR AUTOMATED OPERATION AND HANDLING OF AUTONOMOUS TRUCKS AND TRAILERS HAULED THEREBY, describes a wide variety of systems and processes that are desirable to allow for the monitoring and operation of autonomous functionality within the depicted truck 100 of FIG. 1. These systems can include an on-board vehicle control unit (VCU) 170 that manages overall operation of the vehicle, including autonomous operations, based upon applicable hardware and/or software processes.

One of the control units located (in this example) on the truck 100 is an Electronic Brake Controller (EBC) 150. In general, unmanned autonomous vehicles must be stoppable, even if the system experiences component failures or even power loss. Therefore, the EBC operates to provide redundant and failover/failsafe mechanisms to apply full pneumatic braking power the vehicle wheels 132, 134, and via the pneumatic connections 144 (or other interfaces) to an attached/hitched trailer (not shown).

As shown in FIG. 1, The EBC 150 is interconnected via an electrical connection to appropriate actuators and pressure sensors within a central service brake and parking brake control valve assembly 152, which includes various fluid-pressure-actuated pneumatic and/or hydraulic elements. The valve assembly 152 is, likewise, interconnected by appropriate pressure conduits/lines to various operational elements within the overall truck braking system. One connection is to the human operator foot pedal brake treadle valve 154. A second connection passes through the chassis to the front wheel brake cylinders (on each side) 158 and rear wheel brake cylinders 160. Various known load-balancing, anti-lock and other control circuitry can also be provided and are omitted for clarity. A third connection is to the manual parking brake valve 156, which interfaces with a human-operated parking brake control handle. The EBC also interfaces electronically with a safety control interlock circuit 162 located at an appropriate position on the vehicle.

II. Operational Principles and Features

A. Redundant Failsafe Pneumatic Operation

By way of background, OEM pneumatic brakes are applied by a human operator in two ways. First, parking or emergency brakes are applied by reducing air pressure from one side of the brake chamber to less than 60 psi. This is accomplished by releasing a plunger valve (156) inside the vehicle cab. Alternatively, if tank pressure drops below 60 psi, the parking brakes are applied as a default. Additionally, service brakes are applied by supplying air pressure to the other side of the brake chamber. This is accomplished by depressing the brake treadle valve (154) to supply air from the tank to the brake chamber. The amount of braking power applied is proportional to the pressure supplied from the treadle valve. Full braking power is applied when the full tank pressure is supplied typically, at least approximately 100 psi). The EBC 150, according to an exemplary embodiment, achieves redundancy by utilizing both of these application methods. Electro-pneumatic valves are used to supply tank pressure to the service brake circuit and apply full service brakes. Electro-pneumatic valves are also used evacuate air from the parking brake circuit, which also applies full braking effort. The electro-pneumatic valves are arranged such that when de-energized, full braking efforts are applied. This approach provides failsafe operation. In summary, regardless of why power is lost to the valves (e.g. vehicle power loss, wire breakage, intentional removal, etc.), the brakes will be applied. During nominal operation, the tank pressure supplied to the service brakes is regulated by a proportional electro-pneumatic valve similar to how the pedal-operated treadle valve operates.

B. Dual Mode Capability

A significant aspect of the system and method is its ability to operate in dual modes. It provides computer control for autonomous operation while concurrently enabling manual control when properly configured. Electro-pneumatic valves within the valve assembly 152 are adapted to isolate airflow when operating under manual control. The isolation prevents air pressure from being supplied on the service circuit and evacuated from the parking circuit. If a failure occurs, however, control reverts to the EBC 150, and full brakes are applied by de-energizing all valves.

Another significant feature of the system and method herein is its ability to permit manual application of service brakes at all times, even when the system is nominally under computer control. This ensures that a human user can exercise override under any circumstance. Shuttle valves are used to implement a max function between the pedal treadle valve 154 and the electro-pneumatic proportional valve, which typically resides in the valve assembly 152. Whichever valve is applying the most pressure, and therefore braking effort, is honored by the valve assembly 152 and EBC. This enables the system to be safely used in conjunction with a safety driver when operating autonomously because the safety driver can ultimately apply brakes at any time.

C. Communications

When operating under computer control, the Brake Controller ECU (EBC 150) can accept inputs from both a communications bus (e.g. controller area network (CAN), serial, Ethernet, etc.) and discrete inputs. The communications bus is used under nominal operations to apply and release parking brakes and proportionally apply service brakes. The discrete input signals are provided as a redundant path to apply full braking efforts (for example, during an emergency stop), and to request or inhibit computer control.

D. Logic and Monitoring

The operation of all electro-pneumatic valves is monitored using pressure activated switches and transducers by the Brake Controller ECU (EBC 150). If a valve does not operate as expected, that failure will be detected by the monitoring switch or transducer. The ECU logic will then de-energize all valves to apply full brakes.

III. Implementation

Figure 2:
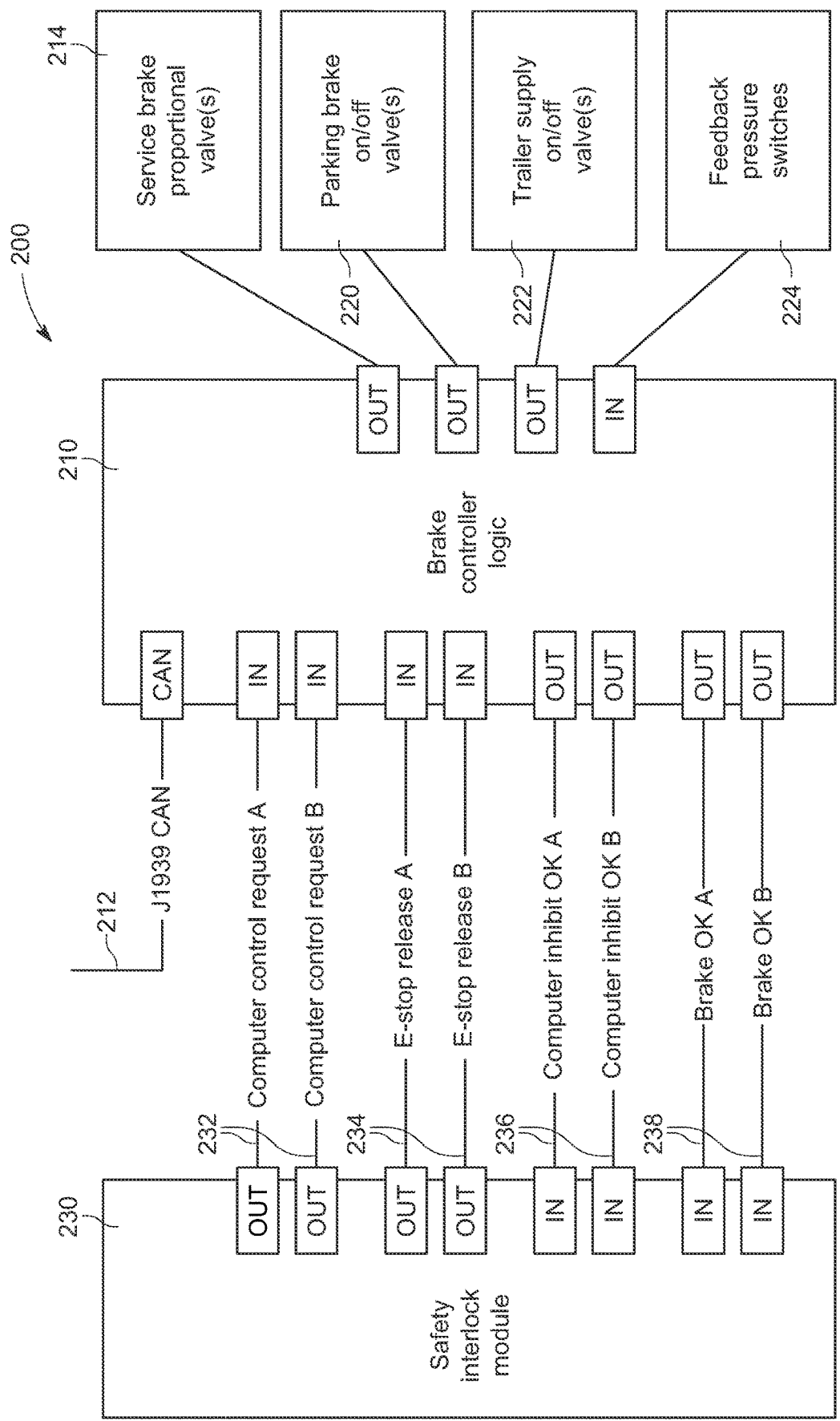
FIG. 2 is a block diagram of a brake controller module, including a safety interlock circuit for use in the truck of FIG. 1, according to an exemplary embodiment.

Reference is made to FIG. 2, which is a simplified block diagram showing an arrangement 200 of inputs and outputs transmitted between modules of the EBC 150. It is noted that throughout the description there is shown two redundant channels of control and communication A and B. Thus, it can be assumed that any description of one channel applies similarly to the second channel herein and such channels A and B are also referred to collectively. The brake controller logic 210 is responsible for enabling computer control of pneumatic brake systems via a J1939 CAN bus 212. It provides proportional control of the service brake proportional valve 214, similar to how a standard treadle valve works, and on/off control of the parking brakes. It controls brake mechanisms for both the tractor and an attached trailer (via pneumatic line (e.g. glad hand connections).

It is contemplated that the brake controller 210 can support an ISO 13849 PLd safety case. To mitigate hazards, ISO 13849 requires that specific safety functions are defined. Those safety functions must include all inputs, logic, outputs, and power that are involved in any potentially hazardous operation. The safety functions defined for the Brake Controller are (a) Emergency Stop Braking and (b) Unintended Control Detection.

The Emergency Stop Braking safety function applies full braking efforts using both service brakes and parking brakes under specific internal conditions and external inputs. The Unintended Control Detection safety function determines if the EBC 150 does not hand over brake controls to the operator when commanded and causes Emergency Stop Braking.

The brake controller 210 also interconnects to the parking brake on/off valve 220, trailer supply on/off valve 222, and any feedback pressure switches via the bus architecture. The arrangement 200 also includes a safety interlock module circuit 230 according to the system and method. As described further below, this module 230 outputs to the brake controller 210 "Computer Control Request" signals 232 that manage whether autonomous control is enabled. The module 230 also outputs "Emergency (E)-Stop Release" signals 234 that cause an emergency stop event to occur. The module 230 also outputs "Computer Inhibit OK" signals 236 that determine when manual control is enabled. Also, the module 230 outputs "Brake OK" signals 238 that determine when normal manual or autonomous brake function can occur.

In operation, the brake controller 210 applies full braking effort upon power loss, regardless of prior operating mode. In alternate embodiments, it is contemplated that the power loss behavior can vary based on operating mode. The brake controller 210 (based on feedback from (e.g.) switches 224) performs all self-checking functions associated with braking. That includes verifying that the brake pressures respond appropriately during an e-stop event and ensuring that brake pressures do not change to release brakes if there is a failure in the e-stop chain within the module. That latching behavior can be maintained across power cycles. Notably, the brake controller overrides the in-cab parking brake plunger (treadle valve 154) functions when operating under computer control.

In operation, the brake controller 210 reads the discrete input signals 232, 234, 236 and 238 from the safety interlock module 230 to determine its intended operating mode. Based on operating mode, it can accept brake commands via the J1939 CAN bus 212. It also performs various self-checking functions and indicate any critical failures to the safety interlock module.

Figure 3:
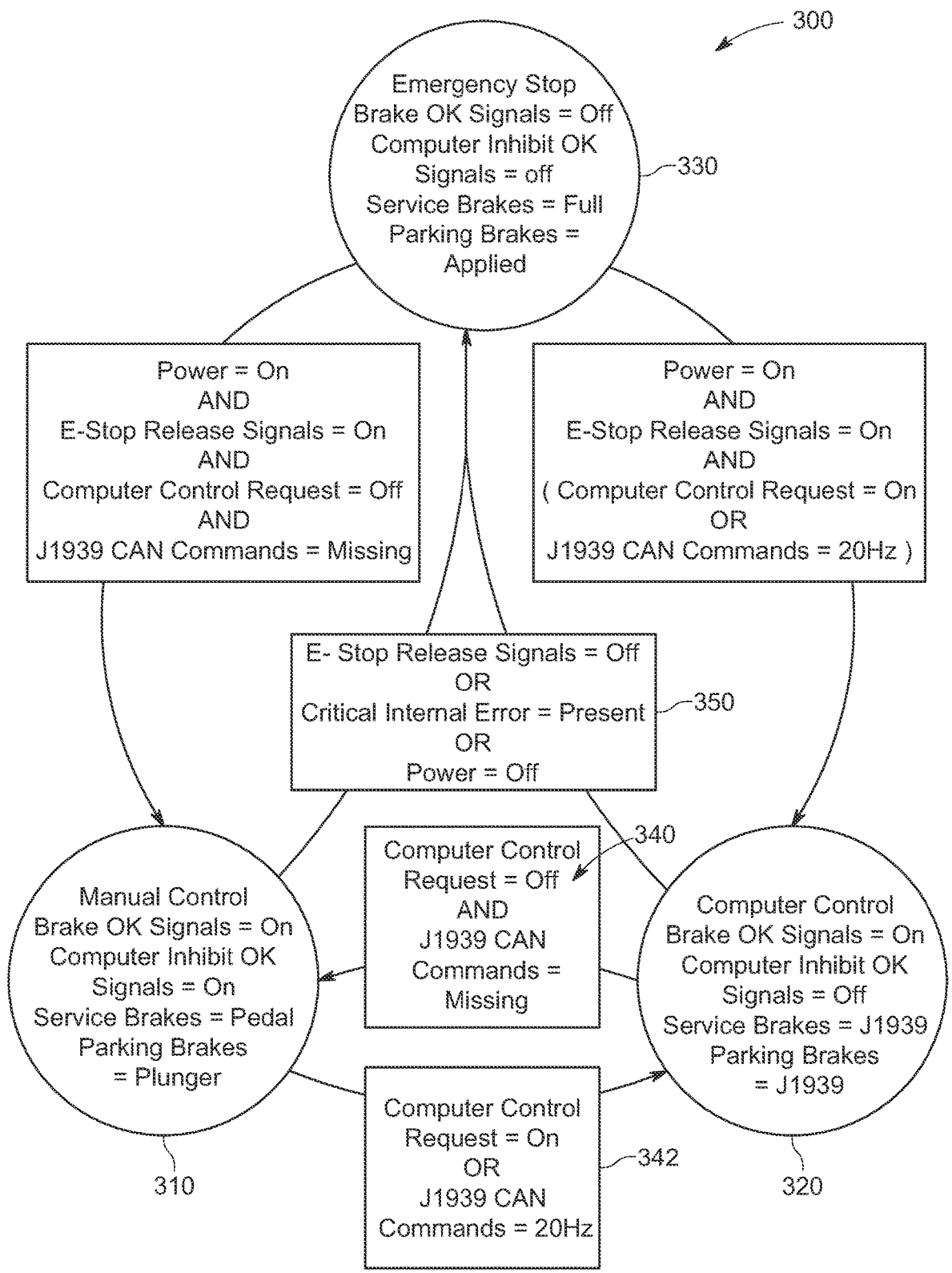
FIG. 3 is a state diagram showing three discrete operational sates/modes for the brake system and controller of FIG. 2, including a manual control mode, a computer control mode and an emergency stop mode.

The above signals 232, 234, 236 and 238 of the interlock module 230 are expressed as a set of interrelated logical states in the diagram 300 of FIG. 3. These states relate to a particular mode of operation.

A. Operating Mode Selection

The brake controller module 210 can operate in one of three modes: Manual Control 310, Computer Control 320, and Emergency Stop 330. These modes are selected based on inputs to the logic block 210 by the safety interlock module 230.

In Manual Control mode 310, the brake controller module 210 releases all control of the service brakes, parking brakes, and trailer supply to ensure that the operator has complete control of the system without interference. This is monitored by the Unintended Control Detection safety function described above.

In Computer Control mode 320, the brake controller module 210 applies braking efforts based on J1939 CAN bus messages. Controlled braking efforts include actuation of valves for service brake pressure 214, parking brake application 220, and trailer air supply 222, according to commands received on the J1939 CAN bus. If the trailer air is supplied, simply controlling the vehicle/truck service brake pressure and parking brake application serves to control trailer service brakes and trailer parking brakes as these circuits are tied together in a known configuration. In alternate implementations it is contemplated that independent trailer service brake control can be provided. Note that in Computer Control mode 320, the operator's foot pedal can still apply service brakes, but the in-cab plungers for parking brake and trailer air supply are not operational. This behavior could potentially produce a new hazard if the service brake pedal does not operate correctly for the operator because the operator will not be able to activate the parking brakes. In that case, the operator can still activate the HV disconnect to power-off the truck and apply parking brakes.

In Emergency Stop mode 330, the brake controller module 210 will apply full braking efforts using both the service and parking brakes/valves 214, 220. This is accomplished by the Emergency Stop Braking safety function described above.

With more particular reference to the state diagram 300 of FIG. 3, the operating mode is selected based on discrete inputs and J1939 CAN commands. The following is a more-detailed description of the various modes 310, 320 and 330.

(1) Manual Control Mode

Manual Control Mode 310 is entered when all of the following conditions 340 are met; namely (a) both of the Computer Control Request lines/signals 232 are electrically disconnected (no current), and (b) J1939 CAN commands are not being received at a rate of at least 20 Hz for more than 100 ms. The mode transition depends upon J1939 CAN commands because in alternate implementations, it can be desirable to remove the Computer Control Request lines and fully apply the J1939 standard paradigm of providing control when messages are present and releasing control when messages are absent.

When the brake controller module transitions into Manual Control Mode 310, the service brakes are released, and the parking brakes and trailer supply are no longer being controlled. The parking brakes and trailer supply revert the state commanded by the in-cab plungers. Note that this can result in immediate application of the parking brakes and/or trailer brakes. This can be mitigated by permitting the overall vehicle control unit (VCU) and/or Safety Interlock Module not request computer control until the in-cab plungers are in an appropriate state. Then, the Computer Inhibit OK signals 236 are asserted to indicate that the module is no longer under computer control.

(2) Computer Control Mode

The Computer Control Mode 320 is entered when either of the following conditions 342 are met; namely (a) either Computer Control Request signal 232 is active or (b) J1939 CAN commands are being received at a rate of at least 20 Hz. Upon entering Computer Control Mode 320, the Computer Inhibit OK signals 236 are de-asserted to indicate the mode change. The brake controller module 210 then applies service brakes, parking brakes, and trailer supply air as directed by the J1939 CAN commands.

(3) Emergency Stop Mode

The Emergency Stop Mode 330 is entered under any of the following conditions 350; namely (a) power loss, (b) either of the E-Stop Release lines/signals 234 is disconnected/de-asserted, (c) a critical internal module error is detected). The critical errors that trigger the Emergency Stop mode 330 are, at a minimum, one or more of the following; (a) a disagreement between the A and B inputs of the E-Stop Release signal (234), (b) a disagreement between the A and B inputs of the Computer Control Request inputs (232) and/or J1939 commands, and/or (c) a feedback indicating failure to apply any braking mechanism. When one of these critical errors is encountered, the brake controller module 210 disconnects/de-asserts the redundant Brake OK signals 238. Otherwise, those signals 238 remain connected to indicate nominal operations. If the brake controller module 210 is in the Emergency Stop mode 330 due to a critical error, it will not exit the Emergency Stop mode until the system has been power cycled and the error cleared. If an error is not cleared, the vehicle/truck can still be recovered by manually caging the brakes. This action serves to release the brakes regardless of air pressure, and thus, additional steps are employed to ensure that the truck is not operated while brakes are caged. As shown, once the module is in the Emergency Stop mode 330, the service brakes and parking brakes are fully applied.

In alternate implementation it is contemplated that differing default brake behavior can occur during power loss and critical internal error based on operating mode. In such alternate implementations power loss and/or critical internal errors may be arranged to trigger an Emergency Stop only if the module is configured to do so. The below-listed Table 1 defines various operational and safety requirements that are met by the brake controller module 210, interlock module 230 and related modes.

TABLE 1

| Requirement |
| --- |
| The Brake Controller Module shall be designed to support an ISO 13849 PLd safety case |
| The Brake Controller Module shall provide a Manual Control mode where the module does not apply braking efforts |
| The Brake Controller Module shall provide a Computer Control mode where the module applies braking efforts per J1939 CAN messages |
| The Brake Controller Module shall provide an Emergency Stop mode where full braking efforts are applied |

TABLE 1-continued

Requirement

The Brake Controller Module shall control the tractor service brake pressure based on J1939 CAN messages in the Computer Control mode
The Brake Controller Module shall control the tractor parking brake application based on J1939 CAN messages in the Computer Control mode
The Brake Controller Module shall control the trailer service brake pressure based on J1939 CAN messages in the Computer Control mode
The Brake Controller Module shall control the trailer parking brake application based on J1939 CAN messages in the Computer Control mode
The Brake Controller Module shall receive redundant discrete Computer Control Request input signals that when active indicate that the Computer Control mode is requested
The Brake Controller Module shall enter Computer Control mode when either of the Computer Control Request signals are present
The Brake Controller Module shall exit Computer Control mode and enter Manual Control mode when both Computer Control Request signals are removed and the J1939 CAN commands are not present for more than 100 ms
The Brake Controller Module shall enter the Emergency Stop mode upon power loss
The Brake Controller Module shall enter the Emergency Stop mode when either of two redundant Emergency Stop Release signals are disconnected
The Brake Controller Module shall enter the Emergency Stop mode upon detection of critical internal errors
The Brake Controller Module shall prevent exiting the Emergency Stop mode upon detection of critical internal errors
The Brake Controller Module shall allow manual application of the service brakes via the brake pedal regardless of operational mode
The Brake Controller Module shall output redundant Brake OK signals to indicate that the module is operating nominally
The Brake Controller Module shall disconnect the Brake OK signals to indicate that the module is not operating nominally
The Brake Controller Module shall control tractor and trailer service brake pressure to achieve a commanded acceleration based on J1939 CAN messages in the Computer Control mode
The Brake Controller Module shall output redundant Computer Inhibit OK signals to indicate that the module is operating in the Manual Control Mode
The Brake Controller Module shall enter Computer Control mode when J1939 CAN messages are received at a rate of at least 20 Hz B. Brake Control Behaviors (1) Service Brake Control The Service Brake Control function enables proportional control of the OEM vehicle brakes over a J1939 CAN communications channel. This is accomplished using a proportional pneumatic valve that regulates pressure to the service brakes, similar to the behavior of the treadle valve 154. The air pressure from the proportional valve 214 and the brake treadle valve 154 is routed through a shuttle valve (e.g. residing in the assembly 152. The result is that the maximum brake pressure applied between the two sources is applied to the brake cylinders 158, 160 via the shuttle valve. Details of how the service brake behaves in each operating mode are provided in Table 2 directly below.

supply or evacuate air pressure to the parking brake supply line, similar to the behavior of the hand-operated in-cab plunger valve(s) 156. To apply parking brakes, the poppet valves evacuate pressure from the parking brake supply lines. To release parking brakes, the poppet valves supply tank/reservoir pressure to the parking brake supply lines. Note that if the reservoir pressure is not high enough to release the parking brakes, the Parking Brake Control function cannot fully release the brakes. The control valves are installed such that the in-cab plunger valve does not affect operation of this function when in the Computer Control mode 320. This alleviates the need for an operator to enter

TABLE 2

| Operating Mode | Service Brake Behavior |
| --- | --- |
| Manual Control | Proportional valve is set to 0 pressure to release brakes. Treadle valve will always have equal or greater pressure, ensuring complete control for driver. |
| Computer Control | Proportional valve is set to pressure based on J1939 CAN commands. If treadle valve supplies greater pressure, it will control brakes. This ensures a safety operator can always apply more braking power if desired. |
| Emergency Stop | Proportional valve is set to maximum pressure to apply full brakes. |

(2) Parking Brake Control

The Parking Brake Control function enables engage/disengage control of the OEM parking brakes over a J1939 CAN communications channel. This is accomplished using (e.g.) poppet valves within the assembly 152 that either the truck/vehicle and manually release the parking brakes every time autonomous operation is desired, or the reservoir pressure is depleted. Details of how the parking brake behaves in each operating mode are provided in Table 3 directly below.

TABLE 3

| Operating Mode | Parking Brake Behavior |
| --- | --- |
| Manual Control | Poppet valves route supply air from the in-cab plunger to the parking brake supply line, allowing the in-cab plunger to control parking brake state. |
| Computer Control | Poppet valves route air from reservoir to parking brake supply line to release brakes or evacuate air from parking brake supply line to apply brakes depending on J1939 CAN command. |
| Emergency Stop | Poppet valves evacuate air from parking brake supply line to apply brakes. |

(3) Trailer Brake Supply Control

The Trailer Brake Supply Control function enables or disables the air supply to a trailer based on J1939 CAN communications commands. This is accomplished using poppet valves within the assembly 152 that either supply air pressure to, or evacuate air pressure from, the trailer emergency supply line, similar to the behavior of the hand-operated in-cab plunger valve 156. If the poppet valves supply air to the emergency supply line, then the trailer parking brakes are released, and the trailer service brakes are controlled from the Service Brake Control function, described above. If the poppet valves evacuate the emergency supply line, then the trailer parking brakes are applied, and the service brake pressure is no longer routed to the trailer brake. The poppet valves are installed such that the in-cab plunger valve 156 does not affect operation of this function when in the Computer Control mode 320. This, again, alleviates the need for an operator to access the cab, and manually supply trailer air if/when the reservoir pressure is depleted. Details of how the parking brake behaves in each operating mode are provided in Table 4 directly below.

TABLE 4

| Operating Mode | Trailer Brake Supply Behavior |
| --- | --- |
| Manual Control | Poppet valves route supply air from the in-cab plunger to the trailer emergency supply line, allowing the in-cab plunger to control trailer supply state. |
| Computer Control | Poppet valves route air from reservoir to trailer emergency supply line to release trailer parking brakes and enable control of the trailer service brakes, or they will evacuate air from emergency supply line to apply trailer parking brakes depending on J1939 CAN command. |
| Emergency Stop | Poppet valves evacuate air from trailer emergency supply line to apply brakes. |

(4) Emergency Stop Braking Safety Function

The Emergency Stop Braking safety function is responsible for executing the Emergency Stop Mode 330. The safety function brings the vehicle to a complete stop by applying full brake efforts under certain exceptional circumstances regardless of operating mode. The Emergency Stop Braking safety function is implemented in accordance with the arrangement 400 shown in FIG. 4. The redundant logic chain, A and B, 410 and 412 are responsible for taking separate discrete actions to apply full braking efforts. The A chain 410 applies full service brakes (420), while the B chain 412 applies parking brakes 422. Respective, feedback, in the form of a Brake OK A 430 and Brake OK B signal 432 monitors for system failure. If either chain 410, 412 fails, the other will still stop the truck. Furthermore, if one chain (A or B) fails, the brakes are not released.

(i) Triggering Mechanisms

The Emergency Stop Braking safety function logic 400 chains each receive a single-ended release signal to transition to the Emergency Stop mode. When the release signal is removed, the brake controller module transitions to the Emergency Stop mode. This constitutes a triggering mechanism for the function.

(ii) Output Signals

Each safety function chain (A or B) is responsible for outputting independent signals to apply full braking efforts. Additionally, each chain outputs a Brake OK status signal to indicate that the chain is operating nominally. The A chain output applies full service brakes by setting the proportional control valve to maximum pressure. The B chain output applies parking brakes by evacuating the parking brake supply lines. Either chain can bring the vehicle to a complete stop without (free of) the other chain. As the overall system speed/velocity is increased, simply applying full braking efforts may not be the safest execution path. Thus, it is contemplated that more intelligent braking controls can be implemented in alternate embodiments. Some features that can be included are (a) ramped application of service brakes, (b) exclusively applying parking brakes if service brake ramping is not operating correctly or the vehicle is below a threshold speed, and/or (c) implementing anti-lock brake system (ABS) functionality in a manner that can be known to those of skill.

(iii) Error Monitoring

Figure 4:
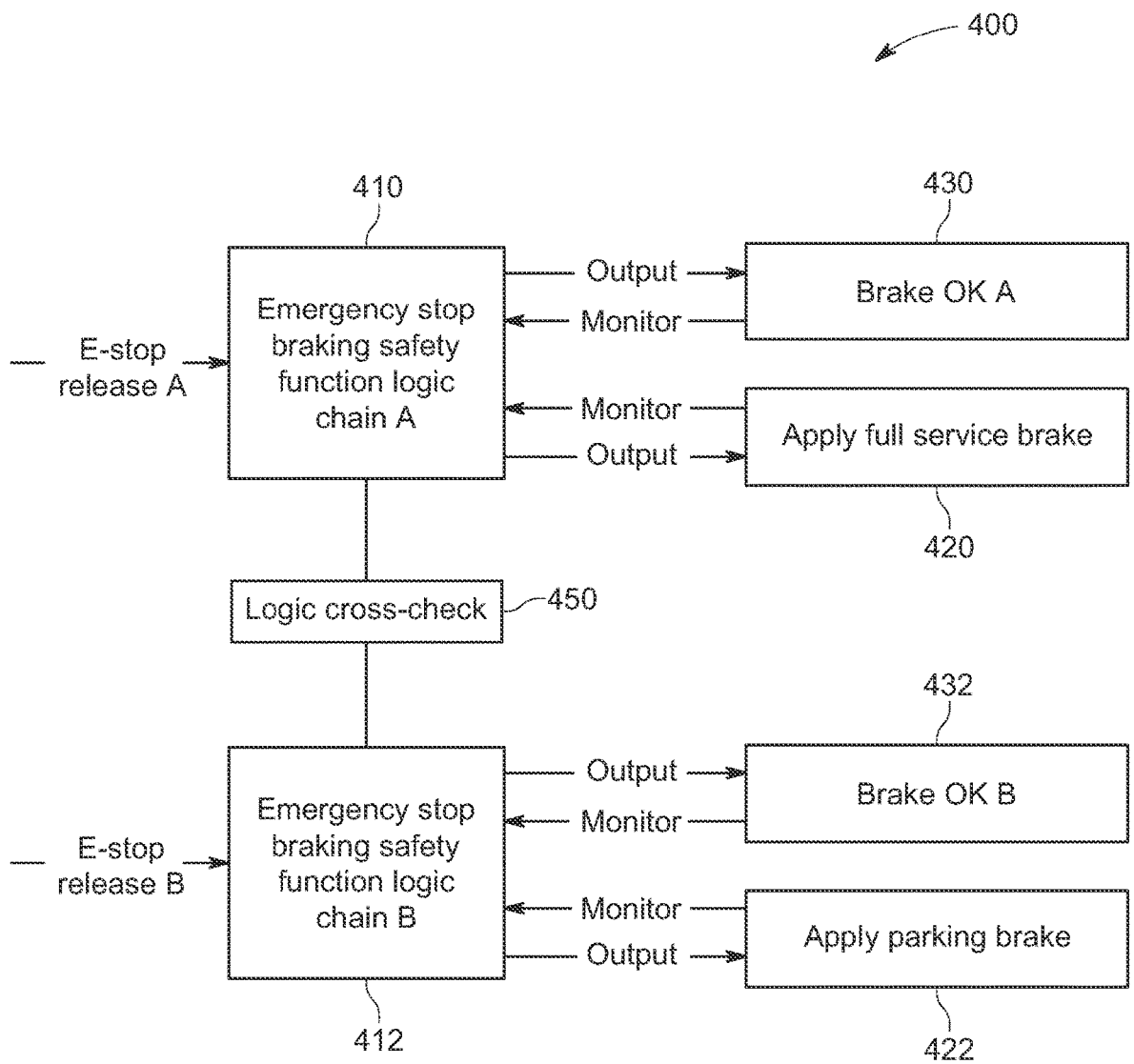
FIG. 4 is a block diagram showing an emergency stop braking safety function according to FIGS. 2 and 3.

Both the A chain logic block 410 and B chain logic block 412 perform error checking via feedback (blocks 430 and 432 in FIG. 4). If an error is detected in one chain, then that chain of the safety function enters an error state. In the error state, full braking efforts are applied, and the associated Brake OK signals are removed. Each chain monitors the other for error status. If one chain detects that the other is in error, the detecting chain also removes its output signals to apply full braking efforts.

(iv) E-Stop Release Signals

Each logic chain 410, 412 A and B performs short-circuit checking on the input E-Stop Release signals. Shorts are checked against ground, power, and between signals. The function will enter the error state when a short circuit is detected. Additionally, the logic blocks compare their respective E-Stop Release signal states against each other via a logic cross-check function 450. If there is a discrepancy in those states for more than 50 ms, the safety function enters the error state.

(v) Output Signals

Each logic chain 410, 412 (A and B) performs short-circuit detection on the output signals. Shorts are checked against ground, power, and between output signals using techniques clear to those of skill. If a short is detected, the offending chain will enter the error state.

(v) Brake Application

Each logic chain (A and B) monitors the effects of its output on brake application. Chain A monitors service brake pressure to verify that the brakes are fully applied. Chain B monitors parking brake pressure to ensure that the parking brakes are applied. If either chain detects that its output is not having the desired effect, it will enter the error state.

(5) Unintended Control Detection

Figure 5:
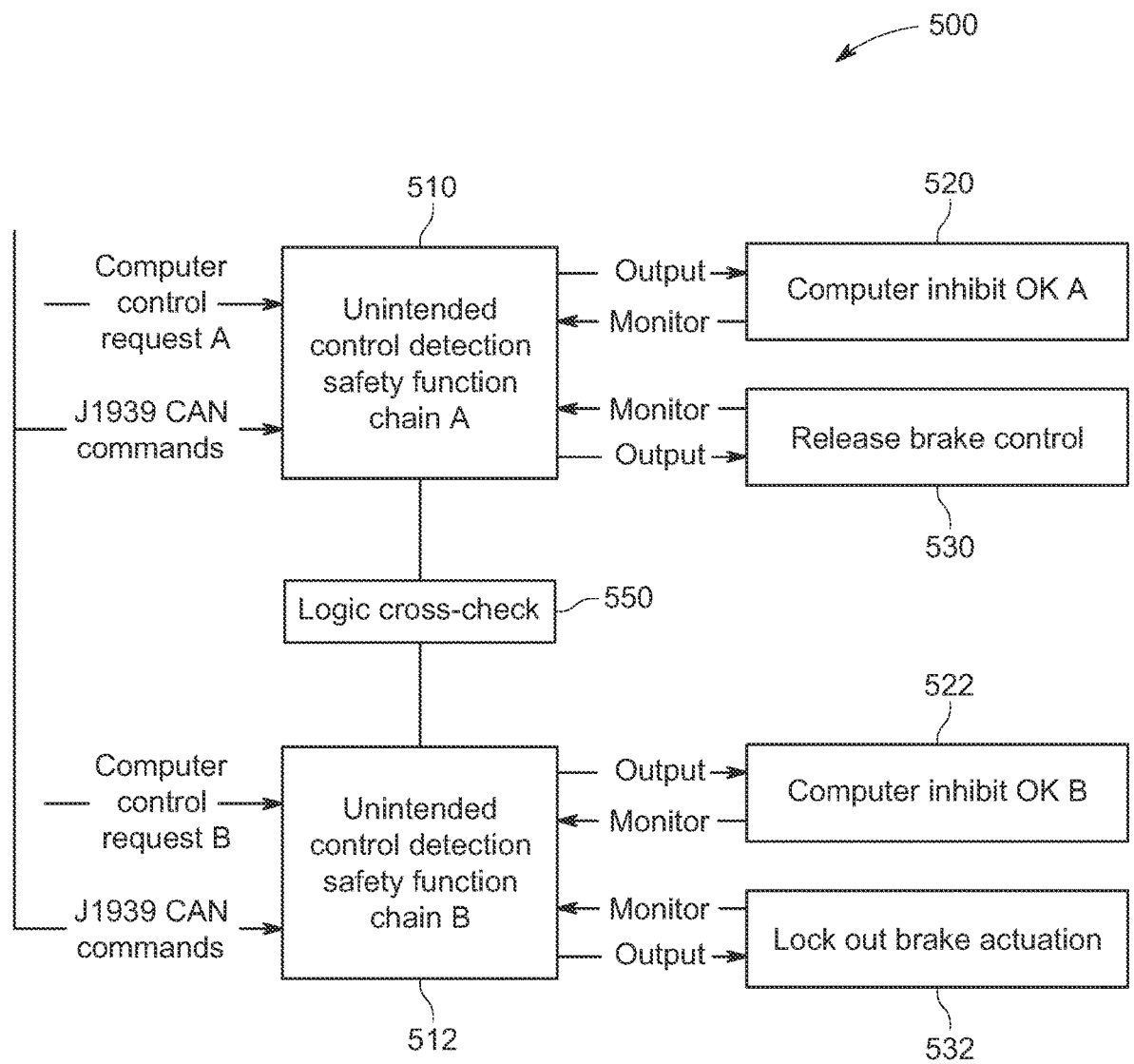
FIG. 5 is a block diagram showing an unintended control detection safety function according to FIGS. 2 and 3.

Reference is made to FIG. 5, which shows and arrangement 500 for the Unintended Control Detection safety function, which is responsible for ensuring that the brake actuation is inactive in the Manual Control mode 310. The safety function releases brake application and locks out service brake control when configured in the Manual Control mode 310. If control is not handed back to the operator, then the safety function triggers an internal error, which results in Emergency Stop Braking.

The redundant logic chains 510 and 512 are responsible for taking separate discrete actions to prevent/block computer control (520, 522) of the brake function. The A chain 510 releases the service brakes and parking brakes 530. The B chain 512 prevents/blocks further brake actuation 532. If either chain (A or B) fails, then the other chain will not release its brake control. If one chain fails, that chain will enter an error state, and Emergency Stop Braking is triggered. This status is then reflected in the Computer Inhibit OK outputs.

(i) Triggering Mechanisms

The Unintended Control Detection safety function logic chains 510, 520 (A and B) each receive a single-ended request signal to request Computer Control mode 320. These signals are asserted/active-high, so that when the signals are removed, the brake controller module 210 can transition to the Manual Control mode 310. Additionally, each logic chain 510, 512 monitors incoming J1939 CAN commands. If brake commands are not being received at 20 Hz for more than 100 ms, and the request signals are removed, then the brake control module 210 will transition to the Manual Control mode 310.

(ii) Output Signals

Each safety function chain 510, 512 (A and B) is responsible for outputting independent signals to prevent computer-controlled braking efforts. Additionally, each chain 510, 512 respectively outputs the Computer Inhibit OK status signal 520, 522 to indicate that the chain is operating in the Manual Control mode. When in the Manual Control mode 310, the A chain 510 output releases the service brakes (530) by setting the proportional control valve to zero pressure and returning parking brake control to the in-cab plunger valve. The B chain 512 output locks out service brake control (532) using (e.g.) poppet valves within the assembly 152. Since parking brake control is returned to the in-cab plunger 156, further actuation is not possible by computer control. If both chains 510, 512 (A and B) are not operating properly, the control is not returned to the driver, and the module enters the Emergency Stop mode 330.

(iii) Error Monitoring

Both the A chain logic block 510 and B chain logic block 512 perform error checking via a cross check 550. If an error is detected in one chain, then that chain of the safety function enters an error state. In the error state, Emergency Stop Braking is performed, and the Computer Inhibit OK signal 520 or 522 is removed/de-asserted. Each chain monitors the other chain for error status. If one chain detects that the other is in error, the detecting chain does not return control to the operator, ensuring that brakes cannot be released.

(iv) Computer Control Request Signals

Each logic chain 510, 512 (A and B) performs short circuit checking on the input Computer Control Request signals. Shorts are checked against ground, power, and between request signals using known techniques. The function does not enter the error state when a short circuit is detected. Additionally, the logic blocks compare their respective Computer Control Request signal states against each other. If there is a discrepancy in those states for more than 50 ms, then the safety function enters the error state.

(v) Output Signals

Each logic chain 510, 512 (A and B) performs short circuit detection on the output signals. Shorts are checked against ground, power, and between output signals. If a short is detected, the offending chain will enter the error state.

(vi) Brake Control Release

Each logic chain (A and B) monitors the effects of its output on returning brake control to the operator. Chain A 510 monitors the computer-controlled brake pressures to verify that the brakes are released. Chain B 512 monitors pressure in the lock-out circuit sections. If either chain detects that its output is not having the desired effect, then it enters the error state.

6. J1939 CAN Communications/Commands

The brake controller module 210 is commanded under the Computer Control mode 320 using the J1939 CAN bus. Brake commands are expected to be received at a rate of at least 20 Hz in accordance with the communication protocol specified hereby. Module status is reported at approximately the same rate.

In a basic implementation, the brake controller module can accept the following types of commands; namely (a) Requested Service Brake Pressure or Percentage, (b) Requested Parking Brake State, and (c) Requested Trailer Supply State. In an alternate implementation, accepted brake controller module commands can also include (d) a Requested Acceleration command. This command causes the brake controller module 210 to perform Service Brake Control to achieve the requested acceleration. Note that this behavior should account for the effects of regenerative braking in an electric vehicle.

Status messages for the J1939 implementation can include the following information, at a minimum; namely (a) Computer Controlled Service Brake Pressure, (b) Brake Pedal Controlled Service Brake Pressure, (c) Parking Brake Status, (d) Trailer Supply Status, (e) Internal Error Status, and (f) Operational Mode.

7. Detailed Design

The brake controller module design consists of three primary sections, the Safety Interlock Module interface, the Service Brake Circuit, and the Parking Brake Circuit. These sections are implemented using a COTS SIL2 rated ECU and pneumatic components (valves, switches, and transducers). The brake controller EBC 150 determines the proper operating mode based on the Safety Interlock Module interface. Based on the operating mode, the EBC uses electrical signals to control the state of various pneumatic valves in the Service Brake Circuit and Parking Brake Circuit. It also monitors pneumatic pressure switches and transducers to verify proper operation of those valves. Those valves and feedback signals are used to implement both computer control via a J1939 CAN interface and the Emergency Stop and Unintended Computer Control Safety Functions.

(i) Operating Mode Selection

As described above, the brake controller EBC 150 operates in one of three modes or states, Emergency Stop 330, Computer Control 320, or Manual Control 310. The operational state is determined by the Safety Interlock Module interface signals and the presence of J1939 CAN commands, as shown in the above-described FIG. 3. Depending on the operational state 310, 320, 330, the Brake Controller EBC thereby set the Safety Interlock Module 230 status signals appropriately.

Figure 6:
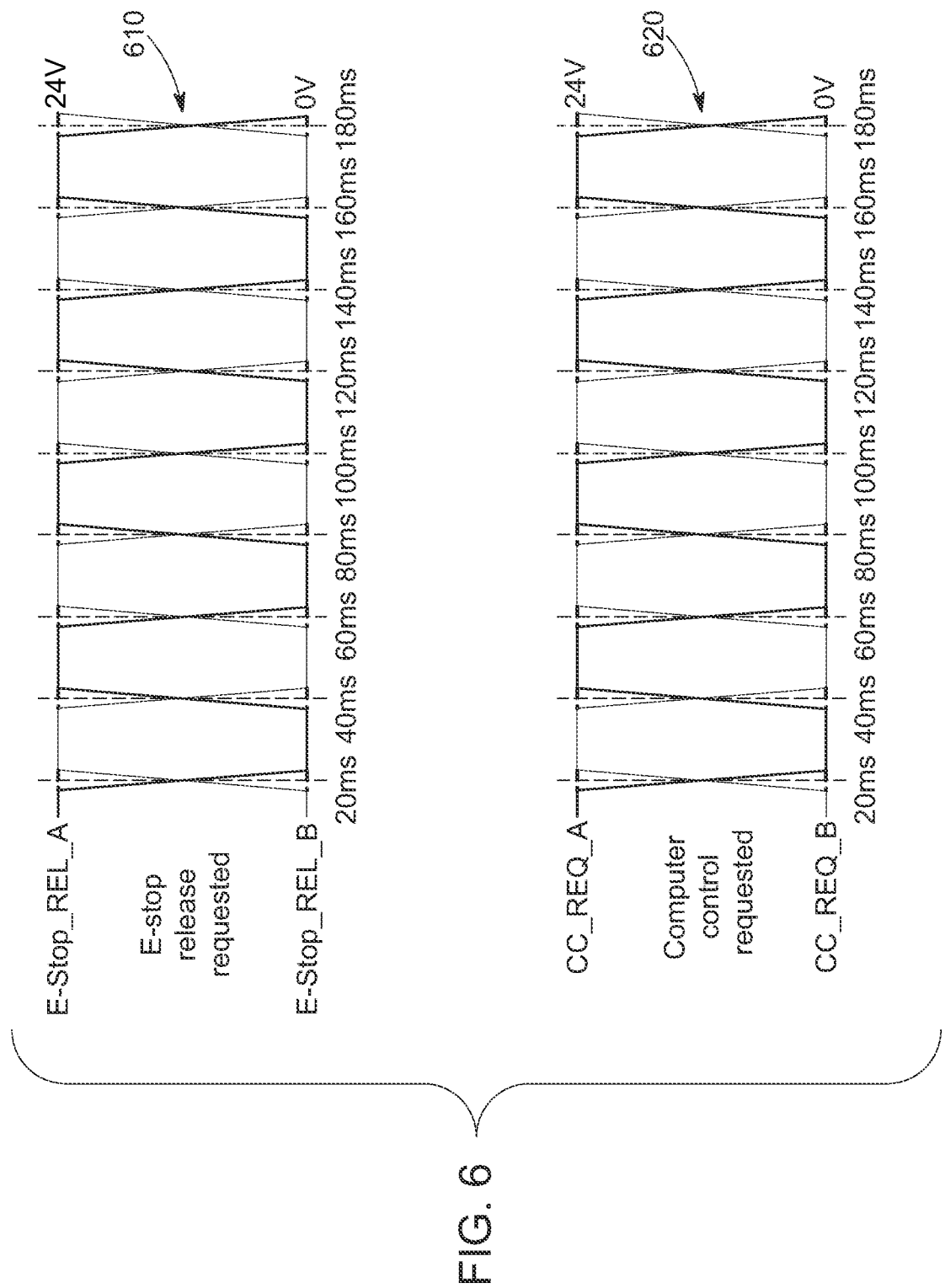
FIG. 6 is an input signal in an exemplary "ON" state for each of the emergency stop release signal and the computer control request signal according to FIGS. 2 and 3.

As also described above, the input signals (E-Stop Release 234 and Computer Control Request 232) from the Safety Interlock Module 230 each consist of two discrete digital lines A and B. Reference is made to the signal diagram of FIG. 6, which shows both the E-Stop Release timing diagram 610 and the Computer Control Requested timing diagram 620 for the "ON" state of each. Each timing diagram shows the A and B chains passed 180-degrees with respect to the other. When a signal is off, both lines are set to 0V. When a signal is on, the two digital lines take on complementary voltage values of either 0V or 24V. As shown, the waveforms toggle at a frequency of 50 Hz, or every 20 ms. The "OFF" State is the opposite of that depicted for each signal 610, 620.

When the E-Stop Release signal 610 is "ON," the Brake Controller EBC 150 releases the E-Stop braking valves within the assembly 152. When the Computer Control Request signal is "ON," the Brake Controller EBC 150 honors brake commands arriving on the J1939 CAN bus.

(ii) Error Monitoring

The brake controller EBC 150 monitors the input signals for certain error conditions. The E-Stop Request and Computer Control Request digital pairs are generally monitored for short circuits, both with respect to a 24V specified peak, and with respect to each other. The following conditions will be monitored to determine if an error has occurred; namely (a) A and B signals are both at 24V for more than 5 ms (thereby indicates possible short between A and B), (b) A or B signal remains at 24V for more than 30 ms (thereby indicates short to 24V), and (c) only one of A or B signals is oscillating (thereby indicates open circuit or short to 0V).

If an error is detected on the E-Stop Release input signal 610, then the brake controller EBC 150 transitions to the Emergency Stop mode 330. If an error is detected on the Computer Control Request input signal, then the brake controller EBC remains in the Computer Control mode 320, but applies full brakes and does not honor J1939 CAN commands.

If J1939 CAN commands are being received at a rate of at least 20 Hz, but the Computer Control Request signal is not "ON," then the brake controller EBC 150 transitions to the Computer Control mode 320, and applies full brakes. All detected errors are reported via the J1939 CAN interface.

(iii) Service Brake Control

Figure 7:
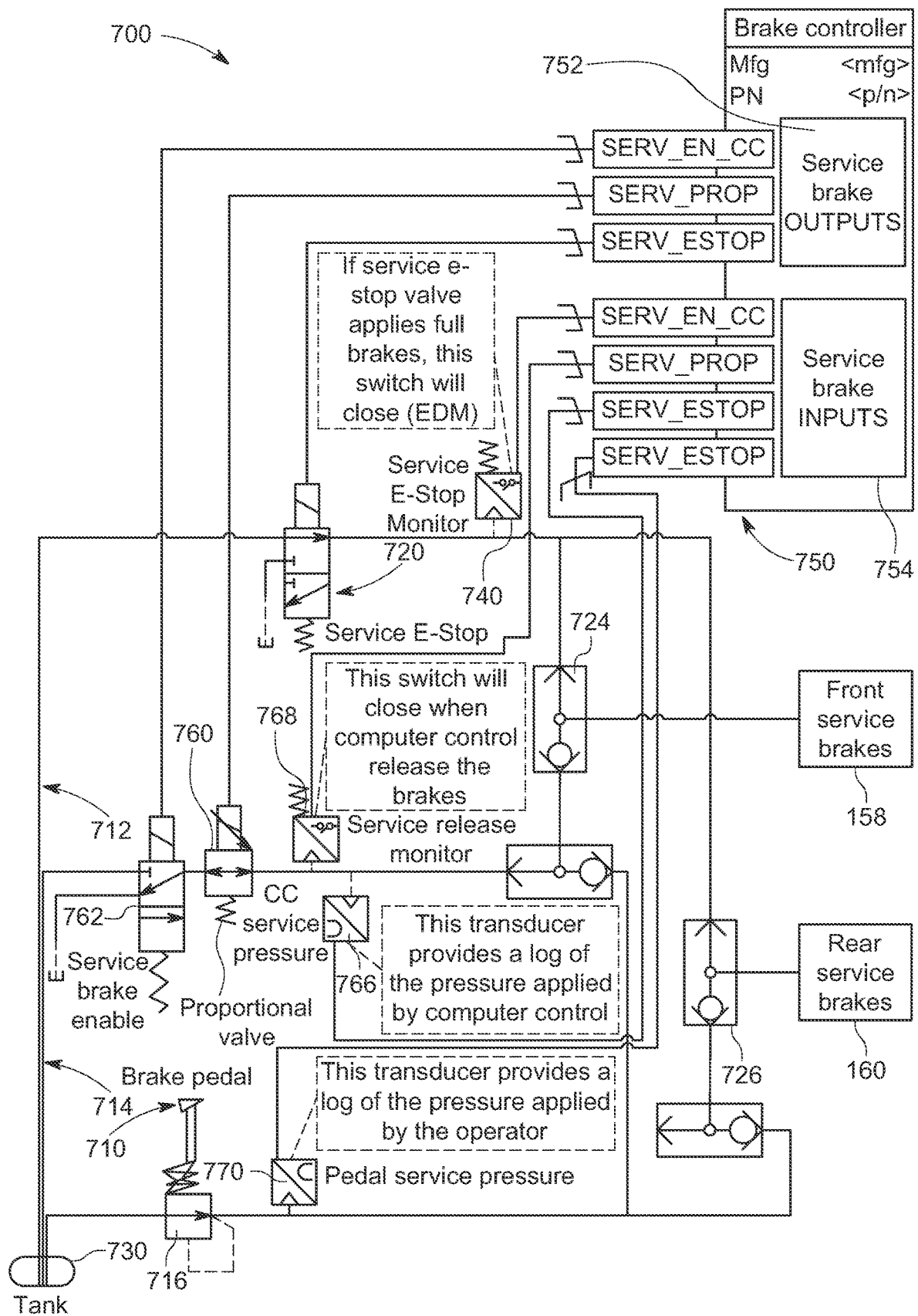
FIG. 7 is a circuit diagram showing exemplary electrical and pneumatic connections for the service brake system of the truck of FIG. 1.

The Service Brake Control Circuit portion 700 of the brake controller module is shown in more detail in FIG. 7. It provides two pneumatic pathways 712 and 714 for applying service brakes 158 and 160. These pathways include a proportional pathway 714 that mimics the brake treadle valve 716 and an on/off pathway 712 that simply applies full braking effort. Both of these pathways are connected to the service brakes 158, 160 via respective shuttle valves 724 and 726, along with the OEM brake pedal 710, as shown. The source which supplies the highest pressure to the circuit will be passed through the shuttle valves to the brakes. This enables the operator to always apply service brakes.

The Service E-Stop valve 720 is a 3/2 poppet that is controlled by the SERV_ESTOP signal, issued by the output block 752 of the EBC brake controller's service brake subsystem/module 750. When the output signal is 0V or disconnected, the valve passes air directly from the pressurized air tank 730 to the service brakes 158, 160, applying full brakes. When the output signal is 12V, the valve 750 changes state and evacuates air between the valve and the shuttle valve 724, 726. If no other source is applying air, then the service brakes 158, 160 are released.

The Service E-Stop Monitor pressure switch 740 provides a 12V signal, SRV_ESTP_MON to the associated input block 754 of the brake controller EBC (750) input 754 to indicate whether the Service E-Stop valve 720 is applying brakes or not. When the valve applies full brakes, the pressure switch 740 closes and return the 12V signal to the input.

Service brake proportional control is provided via a combination 3/2 poppet valve 762 and proportional control valve 760. The 3/2 poppet valve 762, also labeled Service Brake Enable, is used to enable or disable proportional brake control via the valve 760, also labeled Proportional Valve. The Service Brake Enable valve 762 is controlled by the SERV_EN_CC output signal. When the output signal is 0V or disconnected, the valve evacuates air between its output and the Proportional Valve, ensuring that the Proportional Valve cannot apply brakes. When the output signal is 24V, the valve supplies tank pressure to the Proportional Valve 760. The Proportional Valve 760 is then controlled from the SERV_PROP 0-10V signal issued from the EBC output block 752, which is set by J1939 CAN commands. The Proportional Valve 760 regulates air pressure to the brakes via the shuttle valves 724, 726, etc.

The Service Release Monitor pressure switch 768 provides a 12V signal to the SRV_REL_MON input (752) to indicate whether the proportional pathway has released the brakes 158, 160. When the proportional control path 714 releases the brakes, this switch will close and return 12V to the input. Additionally, the CC Service Pressure transducer 766 provides an analog signal to indicate the actual pressure being applied by the proportional control path. That signal is read at the SRV_CC_PRES input (754).

The Pedal Service Pressure transducer also provides an analog signal to indicate the pressure being applied by the brake pedal treadle valve 716. That signal is read at the SRV_PED_PRES input (754) via an in-line transducer 770.

Under nominal computer control operations, the Brake Controller EBC 750 releases the Service E-Stop valve 720 by setting the SRV_ESTOP output to 12V. It will then enable proportional control by setting the SRV_EN_CC output to 24V. Finally, it will set the SRV_PROP output signal based on the J1939 CAN commands to control actual braking pressure (EDOG-BRK-0005).

When operating under manual control, the SRV_PROP output signal should be set to 0 and the SRV_EN_CC signal should be turned off. This will inhibit computer control via the proportional pathway.

(iv) Parking Brake and Trailer Supply Control

Figure 8A:
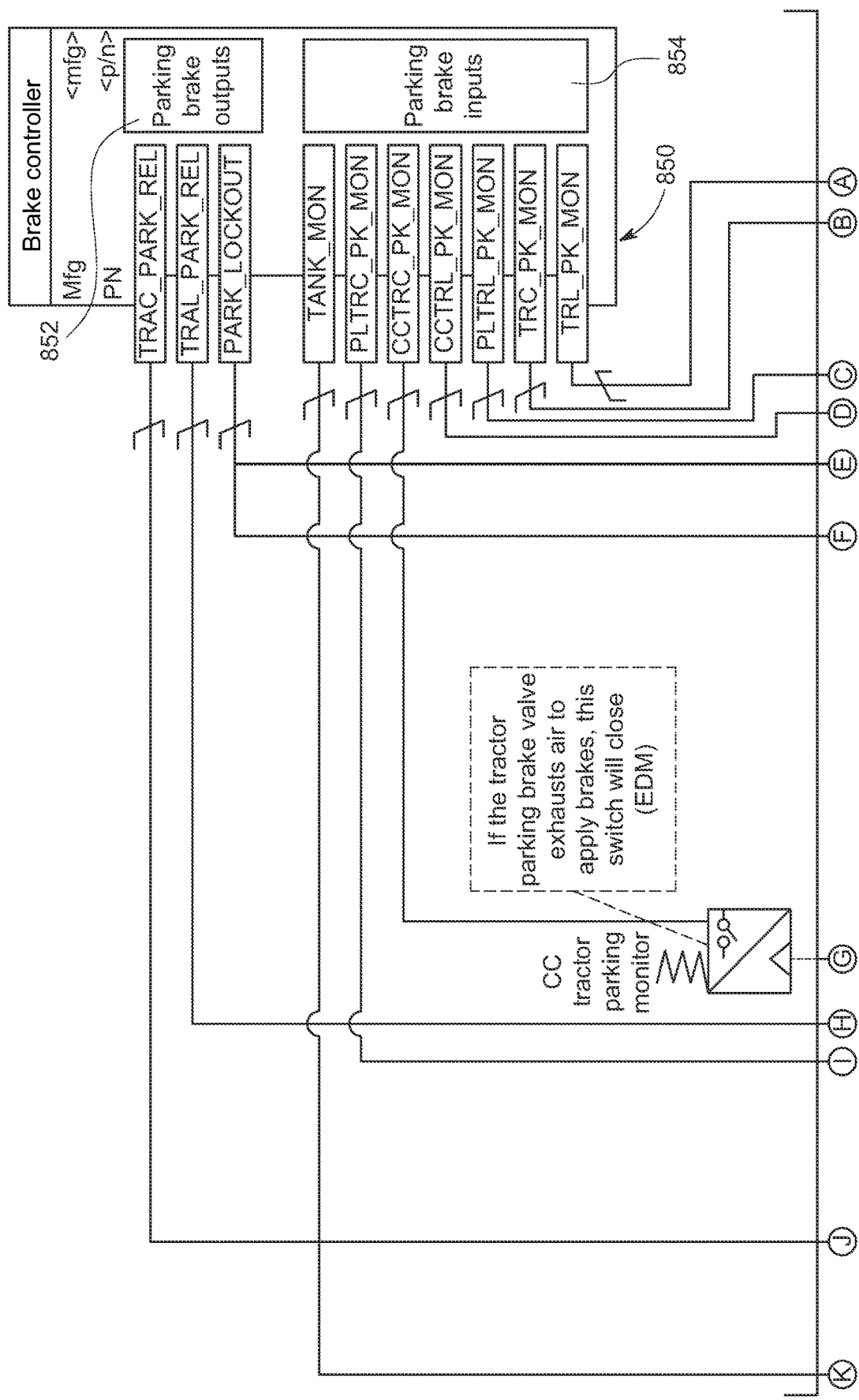
FIGS. 8A-8C are three sections of an overall circuit diagram showing exemplary electrical and pneumatic connections for the parking brake and trailer supply systems of the truck of FIG. 1 (in which circled line terminations A-Q are interconnections between respective lines in each figure)
.
Figure 8B:
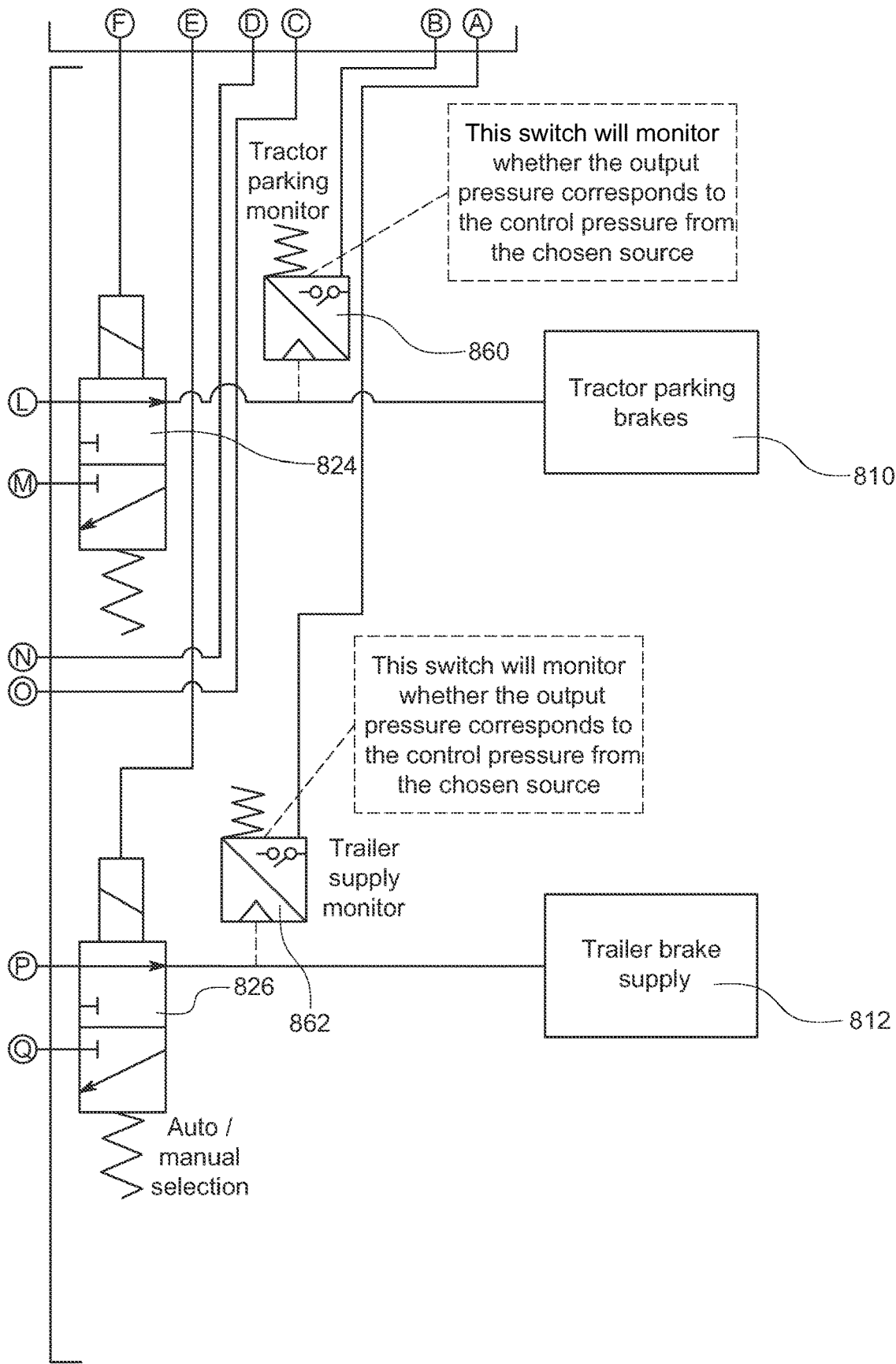
Figure 8C:
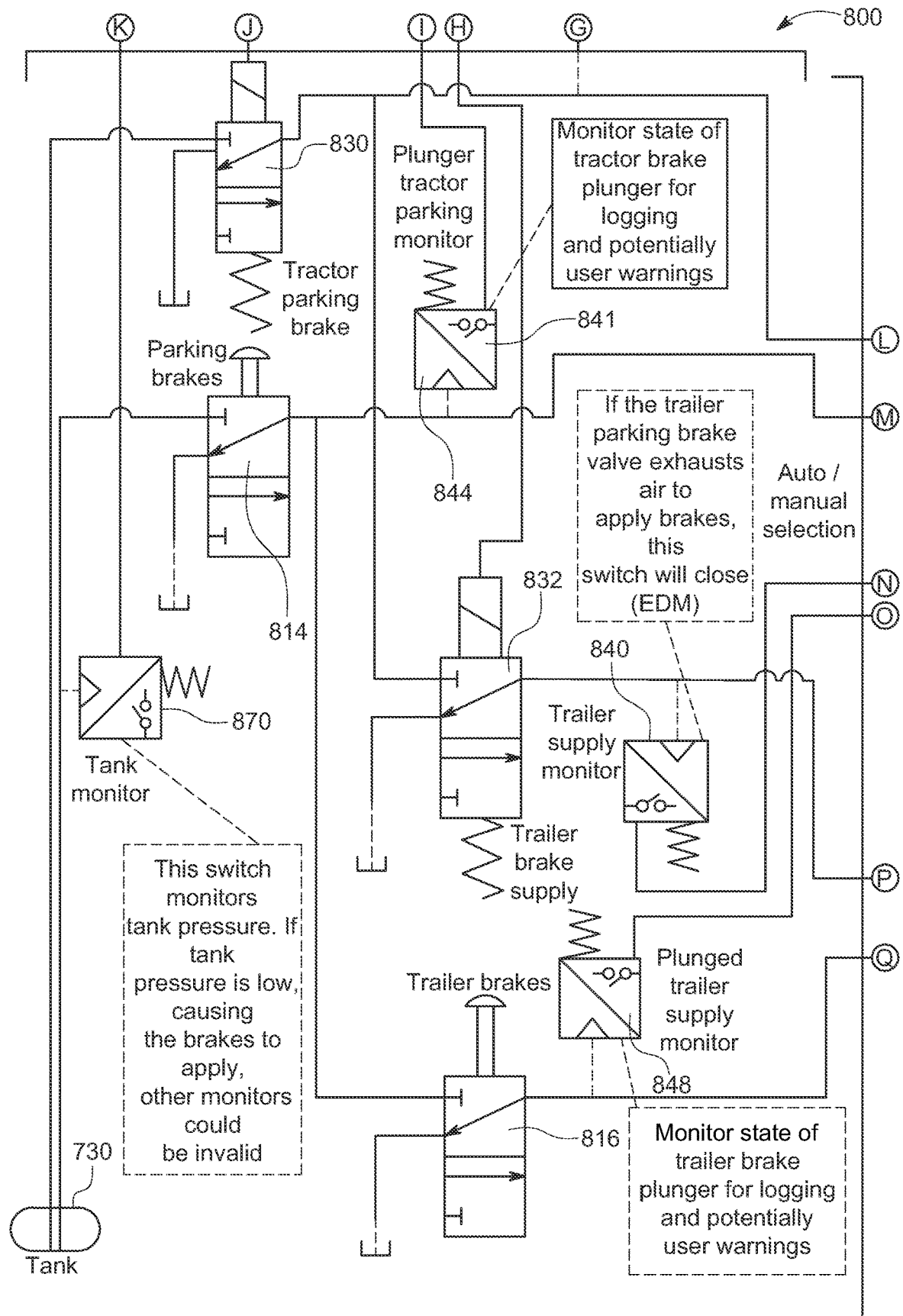

Reference is made to FIGS. 8A-8C, collectively showing a parking and trailer supply control arrangement 800 and associated pressure circuit (which routes and switches pressurized gas/air through various pipes, tubes and/or hoses of appropriate size and pressure-rating), employing the parking brake circuit subsystem/module 850 of the overall brake controller EBC. This subsystem/module 850 and associated arrangement 800 enables computer control of the vehicle/truck parking brakes 810 and trailer air supply (e.g. glad hand) 812. When operating under computer control, the respective in-cab, manually actuated, plungers 814 and 816 for parking brakes and trailer air supply are locked out to prevent misapplication. When control is returned to the operator, those plungers 814, 816 become operational again. Note that this could lead to unexpected behavior. For example, if an operator applies the parking brake and relinquishes control to the autonomy system, the autonomy system could release the parking brake. If the operator subsequently takes manual control without releasing the parking brake plunger, the parking brakes will be applied upon operator intervention.

The Auto/Manual Selection valves 824 and 826 are 3/2 poppets which select between computer control and plunger control for the parking brakes 810. When the PARK_LOCK-OUT signal issued from the brake controller EBS output 852 is set to 0V, or disconnected, these poppet valves 824, 826 select computer control by routing air from the Tractor Parking Brake valve 830 and the Trailer Brake Supply valve 832. When the output is set to 12V, the poppet valves route air from the in-cab plungers, thereby giving the operator control of the parking and trailer brakes 810, 812.

When the Auto/Manual Selection valves 824, 826 are configured for computer control, the Tractor Parking Brake 3/2 poppet valve 830 is used to apply and release the tractor parking brakes 810. When the TRAC_PARK_REL signal is set to 0V or disconnected by the output block 852, the valve evacuates air from its output to the Auto/Manual Selection valve. If that valve is configured for computer control, air is also evacuated from the parking brakes, thereby applying brakes. If the output is set to 12V, air is supplied to the parking brakes to release them. Air is also supplied to the Trailer Brake Supply valve 832.

The Trailer Brake Supply 3/2 poppet valve 832 is used to supply or remove air from the trailer lines, similar to the in-cab plunger 816. When the TRAL_PARK_REL signal at the output block 852 is set to 0V, or disconnected, the valve 832 evacuates air from the trailer supply lines and applies the trailer brakes 812—if a trailer is connected. When the output is set to 12V, the valve routes air from the Tractor Parking Brake valve 830 to the trailer supply lines, which will release the trailer brakes 812, if a trailer is connected. Note that if the Trailer Brake Supply valve 832 is supplying air to the trailer brakes, and the Tractor Parking Brake valve 830 is turned off to apply parking brakes 812, the trailer brakes will be applied as well since the Tractor Parking Brake valve supplies air for the trailer.

The CC Tractor Parking Monitor pressure switch 841 provides a 12V signal to the CCTRC_PK_MON in the input block 854 of the brake Controller EBC 850 input when the Tractor Parking Brake valve 830 is turned off, and applies the brakes 810. Similarly, the CC Trailer Supply Monitor pressure switch 840 provides a 12V signal to the CCTRL_PK_MON input (854) when the Trailer Brake Supply valve 832 turns off, and applies trailer brakes. Note that there is some ambiguity in this case, however, since this pressure switch 840 is also be triggered simply by turning off the Tractor Parking Brake valve 830.

The Plunger Tractor Parking Monitor pressure switch 844 provides a 12V signal to the PLTRC_PK_MON input (854) when the in-cab parking brake plunger 814 is pulled out to apply parking brakes 810. Similarly, the Plunger Trailer Supply Monitor pressure switch 848 provides a 12V signal to the PLTRL_PK_MON input when the in-v cab trailer supply plunger is pulled out to apply trailer brakes.

Additionally, the Tractor Parking Monitor and Trailer Supply (Parking) Monitor pressure switches, 860 and 862, respectively, monitor the overall parking brake and trailer supply status. If the parking brakes 810 are applied, 12V is supplied to the TRC_PK_MON input (854). If the trailer air supply 812 is removed (thereby applying trailer brakes), 12V will be supplied to the TRL_PK_MON input (854).

Under nominal computer control, the brake controller EBC 850 sets the PARK_LOCKOUT output (852) to 0V to lockout the in-cab plungers 814, 816, and to enable computer control. If the EBC receives a J1939 command to release the parking brakes 810, it will set the TRAC_PARK_REL output (852) to 12V. To apply parking brakes 810, it will set the same output to 0V. If the EBC 850 receives a J1939 command to connect the trailer air supply 812, then it will set the TRAL_PARK_REL output to 12V. This action directs the service brake pressure and parking brake pressure to the trailer. To disconnect trailer air, it will set the same signal to 0V.

When operating under manual control, the EBC 850 sets the PARK_LOCKOUT output (852) to 12V to enable control via the in-cab plungers 814, 816, and inhibit computer control.

Note that the circuit further includes a tank monitor pressure switch 870 that monitors pressure of the vehicle supply tank 730, and transmits a signal TANK_MON to the input block 854 of the EBC 850. If tank pressure falls below a predetermined threshold, the brakes are applied, and signals issued by other monitor switches can be considered invalid. This provides a safety feature in the event of loss of pressure to the system.

IV. Conclusion

It should be clear that the above-described system and method provides a robust and effective control arrangement for providing failsafe operation to an autonomous truck and associated trailer in the presence of required human intervention. The system and method ensures that the operating environment remains free of contradictory commands between the human and computer operators and affords deference to the human operator's commands and judgment. The system and method can be integrated with existing vehicle pneumatic, communications and electrical systems, and allows existing and future safety requirements in association with autonomous vehicles to be addressed.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Also, qualifying terms such as "substantially" and "approximately" are contemplated to allow for a reasonable variation from a stated measurement or value can be employed in a manner that the element remains functional as contemplated herein—for example, 1-5 percent variation. Accordingly, this description is meant to be taken only by way of example, and not to otherwise limit the scope of this invention.

What is claimed is:

1. A truck brake apparatus having an autonomously controlled brake assembly and a human controlled brake assembly with interconnected pneumatic brake lines comprising:
    a cab-mounted brake actuator arranged to be handled by the human operator and arranged to selectively deliver pressurized air to truck brakes and a trailer brake air supply;
    a controller that performs autonomous braking operations in response to control inputs and that senses when a human operator is handling the actuator; and
    a plurality of valves, interconnected in a pressure circuit with a pressurized air source on the truck, the pressure circuit including an emergency brake circuit and a service brake circuit, the actuator, the truck brakes and the trailer brake air supply, the plurality of valves responsive to the controller, and comprising a set of shuttle valves arranged to allow the actuator to override selective delivery of pressurized air to the truck brakes and the trailer brake air supply by implementing a max function between pressure caused by the human operator handling the actuator and pressure of the selective delivery of pressurized air from an electro-pneumatic proportional valve,
    wherein the trailer brake air supply is constructed and arranged to deliver pressurized air from the pressure circuit to each of a trailer emergency brake through at least the emergency brake circuit and a trailer service brake through at least the service brake circuit.

2. The truck brake apparatus as set forth in claim 1, wherein the actuator is at least one of a brake foot pedal assembly and a parking brake handle assembly.

3. The truck brake apparatus as set forth in claim 2, wherein the controller is arranged to apply emergency stop braking settings to the valves in response to predetermined conditions.

4. The truck brake apparatus as set forth in claim 1, wherein the valves are adapted to selectively deliver pressurized air to each of service brakes and parking brakes.

5. The truck brake apparatus as set forth in claim 4, wherein the controller is constructed and arranged to operate the valves so as to deliver pressurized air, based upon actuation of the service brake circuit, to the trailer emergency brake.

6. The truck brake apparatus as set forth in claim 5, wherein the valves are adapted to selectively deliver pressurized air to each of service brakes and parking brakes.

7. The truck brake apparatus as set forth in claim 6, wherein the controller is constructed and arranged to operate the valves so as to deliver pressurized air, based upon actuation of the service brake circuit, to the trailer emergency brake.

8. The truck brake apparatus as set forth in claim 5, wherein the pressure circuit includes a plurality of pressure sensing monitor switches, poppet valves that selectively release pressurized air to an external environment and shuttle valves that override pressure flow from each of a plurality of inputs.

9. The truck brake apparatus as set forth in claim 1, wherein the controller inputs and outputs signals using at least two substantially redundant physical and communication protocol channels.

10. The truck brake apparatus as set forth in claim 1, wherein the pressure circuit includes a tank monitor adapted to determine whether tank pressure falls below a predetermined threshold, and wherein, in response thereto, the valves apply at least one of the service brakes and the parking brakes and direct the controller to ignore predetermined sensors and switches within the pressure circuit.

11. A controller that performs autonomous braking operations in response to control inputs and that senses when a human operator is handling the actuator to allow failover between an autonomously controlled braking system and a human controlled braking system in a truck having pneumatic brake lines comprising:
    an interface to a cab-mounted brake actuator arranged to be handled by the human operator and arranged to selectively deliver pressurized air to truck brakes and a trailer brake air supply; and
    an interface to a plurality of valves, interconnected in a pressure circuit that includes an emergency brake circuit and a service brake circuit, between a pressurized air source on the truck and the actuator, the truck brakes and the trailer brake air supply, responsive to the controller,
    wherein the interface is constructed and arranged to override selective delivery of pressurized air to the truck brakes and the trailer brake air supply by implementing a max function of pressure caused by the human operator handling the actuator and pressure of the selective delivery of pressurized air from an electro-pneumatic proportional valve to deliver pressurized air via the actuator,
    wherein the trailer brake air supply is constructed and arranged to deliver pressurized air from the pressure circuit to each of a trailer emergency brake through at least the emergency brake circuit and a trailer service brake through at least the service brake circuit, and
    wherein the controller is constructed and arranged to operate the valves so as to deliver pressurized air, based upon actuation of the service brake circuit, to the trailer emergency brake.

12. The controller as set forth in claim 11, further comprising an interface for performing emergency stop braking settings to the valves in response to predetermined conditions.

13. The controller as set forth in claim 12, wherein control inputs are transmitted over a vehicle CAN bus that communicates with other vehicle systems.

14. The controller as set forth in claim 13, wherein the valves are adapted to selectively deliver pressurized air to each of service brakes and parking brakes.

15. The controller as set forth in claim 14, wherein the pressure circuit includes a plurality of pressure sensing monitor switches, poppet valves that selectively release pressurized air to an external environment and shuttle valves that override pressure flow from each of a plurality of inputs.

16. The controller as set forth in claim 15, wherein the controller inputs and outputs signals using at least two substantially redundant physical and communication protocol channels.

17. The controller as set forth in claim 16, wherein the pressure circuit includes a tank monitor adapted to determine whether tank pressure falls below a predetermined threshold, and wherein, in response thereto, the valves apply at least one of the service brakes and the parking brakes and direct the controller to ignore predetermined sensors and switches within the pressure circuit.

18. The truck brake apparatus as set forth in claim 1, wherein to override selective delivery of pressurized air includes setting a pressure from the electro-pneumatic proportional valve to 0.

19. The truck brake apparatus as set forth in claim 1, wherein the set of shuttle valves allow the actuator to override selective delivery of pressurized air to the truck brakes and the trailer brake air supply in response to brake commands not being received at 20 Hz for more than 100 ms.

20. The controller as set forth in claim 11, wherein to allow the actuator to override selective delivery of pressurized air to the truck brakes and the trailer brake air supply includes the controller activating a manual mode by releasing automated control of the service brakes, the parking brakes, and the trailer brake air supply.

* * * * *